ic effects, they both also have sedative effects on the psychological factors in motion sickness.

UNITED STATES PATENT OFFICE 2,465,233

MOTION SICKNESS CHEWING GUM

John H. King, Bethesda, Md., Jerome S. Wolf, Washington, D. C., and Raymond R. Calvert, La Fayette, Ind.; said Calvert assignor to said Wolf No Drawing. Application May 3, 1946, Serial No. 667,122

2 Claims. (Cl. 167—82)

The object of the present invention is to provide a medicinal preparation for the prevention and relief of motion sickness.

The syndrome of symptoms associated with motion sickness, whether air, sea, train, street car, or automobile, or any form of travel sickness, comprehends nausea, dizziness, headache and vomiting. While these symtoms are relatively limited in number, the causes relate back to mechanical, physiological, and psychological effects of motion accompanied by acceleration or deceleration or variation in altitude.

One of the objects of the present invention is to provide a medicinal preparation which may be taken orally, and which operates upon substantially all the causes and symptoms. Thus the present remedy is designed to counteract the mechanical, physiological, and psychological factors in motion sickness.

The several ingredients of the preparation each have a dominant effect in one or the other of the mechanical, physiological, or psychological factors of the patient's disturbance or ailment. Each of the ingredients at the same time also has a substantial effect on the other factors, and the ingredients thus cooperate with each other to enhance the effect of each of the ingredients upon the several factors involved in motion sickness. Thus each of the ingredients is a synergist for the other ingredients.

The mechanical factors of motion sickness, particularly any occurring in air travel with accompanying changes in altitude, involve pressure changes on the ears and sinuses, and in many cases a resultant temporary blocking of the Eustachian tube and in some cases also a blocking of the sinuses.

In the present invention, chewing gum is quantitively the predominant ingredient. The preparation is designed so that the patient may chew a tablet for a relatively long time. In chewing, the patient relieves the discomfort caused by the effect of pressure changes on the ear and sinuses, by stimulating the swallowing reflex, activating the muscles of the jaw and pharynx, thus maintaining the Eustachian tube between the throat and middle ear open and providing for the interchange of air between the sinuses and atmosphere.

In addition to the mechanical effects obtained merely from the process of chewing the preparation, there are also physiological effects. Thus chewing stimulates the secretion of saliva, which aids in preventing and minimizing nausea and acidosis. The chewing operation also has a psychological action and operates against the psychological factor involved in motion sickness. The process of chewing tends to calm the nervous system and to relieve tension caused by noise and emotional factors deriving from fear, anxiety, insecurity, and lack of confidence in flight or travel. The flavoring present aids in preventing and relieving the effects caused by environmental conditions with respect to ventilation, fumes and odors.

An important ingredient of the present preparation is hyoscine hydrobromide. The major action of hyoscine in the prevention and relief of motion sickness is directed against the physiological effects of motion and also substantially against the psychological effects from fear, anxiety, tension and lack of confidence. It acts as a sedative on the brain and depresses the vagus nerve endings which are stimulated by accelerative forces of motion applied to splanchnic and vascular structures. It reduces unusual stimulation of the orientation mechanisms (vestibular, visual and kinesthetic afferent systems). In summary, the pharmacological rationale for use of hyoscine hydrobromide in aiding in the prevention and relief of motion sickness is based on its anti-cholinergic activity and its sedative and tranquilising central effects.

Thus it will be seen that the hyoscine hydrobromide by its action on the vagus nerve endings, operates directly on one of the important physiological factors of motion sickness and because it serves as a sedative on the brain, it acts both against the physiological factors and the psychological factors.

A third ingredient of the preparation is acetylsalicylic acid or aspirin. This has an analgesic and sedative action which relieves headache and neuralgia, allays emotion and pain. If dissolved in the mouth it tends to have a mild anesthetic action on the oropharyngeal and esophageal mucous membranes.

It is a feature of this invention that, in addition to its individual and major field of effectiveness, each ingredient also has a secondary or subsidiary field of effectiveness which overlaps the field of another ingredient. Thus, the chewing gum and hyoscine overlap in the psychological field, one by the mechanical process of chewing, the other by its sedative and tranquilising effects due to its physiological effect upon the brain.

Similarly, hyoscine hydrobromide and acetyl salicylic acid have an overlapping field of action in that, in addition to their individual physiological effects upon the nervous system, they each have a general sedative effect upon the brain.

In addition to the direct effects of the process of chewing the chewing gum which have been discussed previously, its employment in the present preparation as the vehicle for the remaining ingredients acts to make the hyoscine hydrobromide available for immediate absorption by the alimentary tract in solution form and its therapeutic action is therefore rapid. On the other hand, the acetyl salicylic acid, which is not as readily soluble in saliva as the hyoscine hydrobromide, is extracted from the gum base more slowly and gives the effect of repeated administrations.

The hyoscine hydrobromide enters the system rapidly and has an immediate effect as described earlier. The hyoscine remains in the system but its effectiveness is diminished with time. In the present invention, the prolonged administration of the acetyl salicylic acid, acts to boost or enhance the effect of the hyoscine in its own special field of effectiveness, during the period when its effectiveness would otherwise diminish to substantial ineffectiveness.

The early quick action of hyoscine hydrobromide, this being followed by the slower and more prolonged administration of acetyl salicylic acid, accompanied by the chewing process which has the several effects described above, all result in the synergistic effect of the several ingredients.

The preferred composition of the present preparation is as follows:

Hyoscine hydrobromide grs. $1/400$
Acetyl salicylic acid grs. $3\frac{1}{2}$
Artificial fruit flavoring
Chicle gum base to make one tablet
Sugar coated The present applicants have made a large number of observations upon air-travelers who have taken the present preparation and have compared the effects with other preparations which omitted one or more of the present ingredients, and have observed that the effect of the present preparation is so far out of line as compared with the other preparations that it cannot be accounted as due merely to the total effect of the ingredients by themselves, but as being due to the synergistic effect of each of the ingredients upon the others in addition to their individual action.

For the adult traveler, one tablet, consisting as described above, should be chewed approximately one hour before departure and another tablet should be chewed about the time of departure. The traveler may also take one tablet one hour after departure and repeat by taking one tablet every two hours, if needed. The ingredients are extracted from the gum base after approximately five to ten minutes of chewing, however the gum may be chewed as long as desired. It is advantageous to chew during descent (as when plan lands).

The chewing gum of the present preparation serves as a vehicle or carrier for the hyoscine hydrobromide and acetyl salicylic acid which should, preferably, be intimately and uniformly dispersed throughout the chewing gum and coating. Each tablet of chewing gum containing the desired dosage of hyoscine hydrobromide, preferably $1/400$ grain, and the desired dosage of acetyl salicylic acid, preferably $3\frac{1}{2}$ grains, should have a sugar coating. The flavoring agent may be dispersed throughout the chewing gum or may be contained in the sugar coating.

The amount of acetyl salicylic acid in each tablet may vary from 2 to $3\frac{1}{2}$ grains; and the amount of hyoscine hydrobromide may vary from $1/600$ grain to $1/300$ grain. The ratio of hyoscine hydrobromide to acetyl salicylic acid may vary from 1 to 2,000 to 1 to 600.

If desired acetyl salicylic acid may be substituted in whole or in part by other more or less analogous drugs. As an example, $1/400$ to $1/100$ grain of hyoscyamine hydrobromide may be substituted for the acetyl salicylic acid content of the tablet.

We claim:

1. A medicinal preparation to aid in the prevention and relief of motion sickness comprising a tablet of chewing gum and hyoscine hydrobromide and acetyl salicylic acid in an amount ranging from two to $3\frac{1}{2}$ grains.

2. A medicinal preparation to aid in the prevention and relief of motion sickness comprising a tablet of chewing gum and hyoscine hydrobromide and acetyl salicylic acid.

JOHN H. KING.
JEROME S. WOLF.
RAYMOND R. CALVERT.

REFERENCES CITED

The following references are of record in the file of this patent:

UNITED STATES PATENTS

| Number | Name | Date |
| --- | --- | --- |
| 1,630,763 | Raymer | May 31, 1927 |

OTHER REFERENCES

Merck Manual, 7th ed. (1940), page 1067. (Copy in Div. 43.)

Extra Pharmocapoeia, vol. 2, 21st ed. (1938), page 341. (Copy in Division 43.)

Manufacturing Chemist, vol. 15, June 1944, page 221. (Copy in Division 43.)

Science News Letter, vol. 42, Dec. 12, 1942, page 379. (Copy in Scientific Library.)

Food Manufacture, Aug. 1937, page 271 (167–82.7). (Copy in Div. 43.)